US011031654B2

(12) United States Patent
Cheng et al.

(10) Patent No.: US 11,031,654 B2
(45) Date of Patent: Jun. 8, 2021

(54) HIGH-WETTABILITY SEPARATOR AND PREPARATION METHOD THEREOF

(71) Applicant: Shanghai Energy New Materials Technology Co., Ltd., Shanghai (CN)

(72) Inventors: Alex Cheng, Shanghai (CN); Lei Xiong, Shanghai (CN); Honggui Deng, Shanghai (CN); Fangbo He, Shanghai (CN); Weiqiang Wang, Shanghai (CN)

(73) Assignee: Shanghai Energy New Materials Technology Co., Ltd., Shanghai (CN)

( * ) Notice: Subject to any disclaimer, the term of this patent is extended or adjusted under 35 U.S.C. 154(b) by 128 days.

(21) Appl. No.: 16/306,554

(22) PCT Filed: Apr. 13, 2017

(86) PCT No.: PCT/CN2017/080411
§ 371 (c)(1),
(2) Date: Nov. 30, 2018

(87) PCT Pub. No.: WO2017/206593
PCT Pub. Date: Dec. 7, 2017

(65) Prior Publication Data
US 2019/0157645 A1    May 23, 2019

(30) Foreign Application Priority Data
Jun. 1, 2016   (CN) .......................... 201610380478.0

(51) Int. Cl.
| H01M 2/16 | (2006.01) |
| H01M 10/0525 | (2010.01) |
| H01M 2/14 | (2006.01) |
| H01M 50/409 | (2021.01) |
| H01M 50/40 | (2021.01) |
| H01M 50/403 | (2021.01) |
| B29K 23/00 | (2006.01) |
| H01M 4/02 | (2006.01) |

(52) U.S. Cl.
CPC ..... *H01M 50/409* (2021.01); *H01M 10/0525* (2013.01); *H01M 50/40* (2021.01); *H01M 50/403* (2021.01); *B29K 2023/065* (2013.01); *C08L 2207/062* (2013.01); *C08L 2207/068* (2013.01); *H01M 2004/027* (2013.01); *H01M 2004/028* (2013.01)

(58) Field of Classification Search
CPC .. C08L 23/06; C08L 23/0815; C08L 2666/04; C08L 2666/06; C08L 23/04; C08L 23/00; C08L 2205/02; H01M 2/1653; H01M 2/1686; H01M 8/106; C08F 255/02; C08J 2323/06; C08J 2323/08
See application file for complete search history.

(56) References Cited

U.S. PATENT DOCUMENTS

| 3,351,495 A * | 11/1967 | Larsen ................ H01M 2/1653 429/252 |
| 4,699,857 A * | 10/1987 | Giovannoni ........ C08L 23/0853 429/204 |
| 5,948,519 A * | 9/1999 | Yagi ....................... B01D 71/76 428/304.4 |
| 6,423,445 B1 * | 7/2002 | Kato ................... H01M 2/1653 429/142 |
| 2003/0187142 A1 | 10/2003 | Hellums |
| 2006/0177643 A1 | 8/2006 | Kondo et al. |
| 2006/0194100 A1 * | 8/2006 | Tanaka .................. H01M 2/162 429/142 |
| 2007/0015876 A1 | 1/2007 | Inagaki et al. |
| 2011/0003200 A1 * | 1/2011 | Shizuka ............ H01M 10/0525 429/206 |
| 2011/0159346 A1 * | 6/2011 | Yamamoto .......... H01M 2/1686 429/144 |
| 2011/0171523 A1 * | 7/2011 | Samii .................... H01M 2/145 429/188 |
| 2012/0231323 A1 * | 9/2012 | Takagi .................. H01M 2/145 429/144 |

(Continued)

FOREIGN PATENT DOCUMENTS

| CN | 1649957 A | 8/2005 |
| CN | 102199320 A | 9/2011 |

(Continued)

OTHER PUBLICATIONS

Machine translation of JP-05025305-A (Year: 1993).*
Formal translation of Kono (JP 05025305 A) (Year: 1993).*
Supplementary European Search Report dated Dec. 9, 2019, for related EP Application No. 17805538.0.
International Search Report from related PCT Application No. PCT/CN2017/080411 dated Jul. 18, 2017.
First Office Action dated Apr. 17, 2019, for related Chinese Application No. 201610380478.0.

(Continued)

*Primary Examiner* — Imran Akram
(74) *Attorney, Agent, or Firm* — Burns & Levinson, LLP; Joseph M. Maraia

(57) ABSTRACT

Disclosed in present invention are a high-wettability separator and a preparation method therefor. The separator comprises an ethylene copolymer, a grafting polyolefin, an ultrahigh molecular weight polyethylene having a molecular weight ranging from $1.0 \times 10^6$ to $10.0 \times 10^6$, and a high-density polyethylene having a density ranging from 0.940 g/cm$^3$ to 0.976 g/cm$^3$, the content of the ethylene copolymer is 1-5 parts by weight, and the content of the grafting polyolefin is 0-5 parts by weight, on the basis that the total weight of the ultrahigh molecular weight polyethylene and the high-density polyethylene is 100 parts. The separator has a contact angle with lithium ion battery electrolyte of 20° to 40°.

7 Claims, No Drawings

(56) References Cited

U.S. PATENT DOCUMENTS

| | | | |
|---|---|---|---|
| 2012/0237832 A1* | 9/2012 | Nakagiri | H01M 2/16 429/246 |
| 2014/0030606 A1* | 1/2014 | Kojima | H01M 2/1646 429/246 |
| 2015/0056492 A1* | 2/2015 | Huang | H01M 2/1686 429/145 |
| 2015/0111109 A1* | 4/2015 | Yamada | H01M 2/166 429/251 |
| 2015/0280197 A1 | 10/2015 | Zhao et al. | |
| 2016/0226046 A1* | 8/2016 | Moffat | H01M 8/0239 |
| 2016/0336569 A1* | 11/2016 | Mizuno | B32B 27/32 |
| 2017/0152359 A1* | 6/2017 | Yen | B32B 5/24 |
| 2017/0170443 A1* | 6/2017 | Murakami | H01M 4/131 |

FOREIGN PATENT DOCUMENTS

| | | | |
|---|---|---|---|
| CN | 102868642 A | 1/2013 | |
| CN | 103131079 A | 6/2013 | |
| CN | 103904276 A | 7/2014 | |
| JP | S63-178439 A | 7/1988 | |
| JP | 05025305 A * | 2/1993 | C08J 5/18 |
| JP | 2014-156574 A | 8/2014 | |
| JP | 2016-023307 A | 2/2016 | |
| WO | WO-2015104964 A1 * | 7/2015 | B29C 48/9155 |

OTHER PUBLICATIONS

Office Action dated Nov. 24, 2020 for Korean Application No. 10-2018-7037657.

Notice of Reasons for Refusal dated Nov. 4, 2020, for related Japanese Application No. 2019-516040.

Notice of Intention to Grant for EP Application No. 17805538.0 dated Mar. 12, 2021.

* cited by examiner

HIGH-WETTABILITY SEPARATOR AND PREPARATION METHOD THEREOF

CROSS REFERENCE TO RELATED APPLICATIONS

This is a U.S. National Stage Application, filed under 35 U.S.C. 371, of International Patent Application No. PCT/CN2017/080411, filed on Apr. 13, 2017, which claims priority to Chinese patent application No. 201610380478.0 filed on Jun. 1, 2016, contents of both of which are incorporated herein by reference in their entireties.

TECHNICAL FIELD

The invention relates to the field of electrochemistry, particularly to a lithium ion battery separator and preparation method thereof.

BACKGROUND ART

Lithium ion batteries are usually composed of a positive electrode, a negative electrode, a separator, electrolyte solution, and a battery case. In the structure of lithium ion batteries, the separator is one of the key inner elements. The main functions of the separator are to separate the positive and the negative electrodes of the battery so as to prevent a direct contact and thus short circuit between the positive and the negative electrodes, and to enable electrolyte ions to pass smoothly during the charging and discharging of the battery to form a current; moreover, when the operation temperature of the battery rises abnormally, the separator closes the migration channel of electrolyte ions, and cut off the current to ensure the safety of the battery. Thus it can be seen that the performance of the separator determines the interface structure and internal resistance of batteries, directly affecting the capacity, cycle and safety performances of batteries. The separator with excellent performance plays an important role in improving overall performance of batteries. Currently, commercially available separators for lithium ion battery generally employ polyolefin porous films.

The main performance parameters of the battery separators include thickness, porosity, pore size, pore size distribution, strength, and the like. In order to reduce the internal resistance of the battery, the area of electrodes must be as large as possible, such that the thickness of the separator is required to be as thin as possible. Although the battery separator itself is not electrically conductive, the conductive ions need to migrate through the separator. This requires that the separator itself has a certain number of pores, i.e. porosity. However, excessive porosity results in reduced strength of the separator, thereby influencing the overall reliability of batteries. Additionally, the wettability of the electrolyte on the separator directly affects the resistance of ion migration. The better the wettability, the smaller the resistance for ions to migrate through the separator, and the smaller the internal resistance of batteries. Generally, in the case where the pore size is not very large, the more uniform the pore size distribution, the better the wettability of the electrolyte. The separator is required to be drawn during production and assembly of battery components; and after the assembly is completed, it is also necessary to ensure the separator not to be pierced by electrode materials. Therefore, the separator needs not only sufficient tensile strength but also a certain puncture strength.

In fact, in the case that separators with the same thickness have certain porosity, pore size and pore size distribution, the wettability of its surface against the electrolyte solution mainly depends on materials of the separators per se. For common polyolefin separators, their surfaces comprise mainly non-polar groups, exhibiting general wettability against lithium ion battery electrolyte. After ceramic particles are coated on the surface of the polyolefin separator, abundant specific surface areas of the ceramic particles help to adsorb electrolyte, thereby improving the wettability of the surface of the polyolefin separator. However, if the coated ceramic particles are peeled off, the wettability of the polyolefin separator substrate still maintains original properties, and if the coated ceramic particles are too densely packed on the surface of the separator, the original porosity of the separator may be blocked, which may influence the normal use of the separator. Therefore, in order to obtain permanently stable and improved wettability, it is necessary to improve the properties of the substrate of the polyolefin separator.

Accordingly, there is a need in the art to provide a high-wettability polymeric separator.

SUMMARY OF THE INVENTION

The present invention is aimed to provide a high-wettability lithium ion battery separator.

In a first aspect, the invention provides a lithium ion battery separator, the separator comprising: an ethylene copolymer, a grafted polyolefin, an ultrahigh molecular weight polyethylene having a molecular weight of $1.0 \times 10^6$ to $10.0 \times 10^6$, and a high-density polyethylene having a density in the range of 0.940 to 0.976 $g/cm^3$; wherein the content of the ethylene copolymer is 1-5 parts by weight, the content of the grafted polyolefin is 0-5 parts by weight, on the basis that the total weight of the ultrahigh molecular weight polyethylene and the high-density polyethylene is 100 parts.

The separator has a contact angle with lithium ion battery electrolyte of 20° to 40°, preferably 21° to 30°, more preferably 22° to 27°.

In a preferred embodiment, the separator has a puncture strength of 540 grams or more.

In another preferred embodiment, the separator has a thickness of 9 to 35 μm, a micropore diameter of 0.3 to 0.65 μm, and a porosity of 40 to 50%.

The ethylene copolymer is one or more selected from the group consisting of ethylene-vinyl acetate copolymer, ethylene-acrylate copolymer, ethylene-methacrylic acid copolymer, ethylene-acrylic acid copolymer, and ethylene-methyl methacrylate copolymer.

The grafted polyolefin is one or more selected from the group consisting of maleic anhydride grafted polyethylene, acrylic acid grafted polyethylene, and glycidyl methacrylate grafted polyethylene.

In another preferred embodiment, the ethylene copolymer has a density of 0.936 to 0.950 $g/cm^3$; and the grafted polyolefin has a density of 0.950 to 1.13 $g/cm^3$.

In another preferred embodiment, the weight ratio of the ultrahigh molecular weight polyethylene to the high-density polyethylene is 1:1 to 1:20, more preferably 1:2 to 1:10, most preferably 1:5 to 1:10.

In another preferred embodiment, the ultrahigh molecular weight polyethylene has a molecular weight of $2.0 \times 10^6$ to $8.0 \times 10^6$, more preferably $3.5 \times 10^6$ to $5.0 \times 10^6$; the high-density polyethylene has a density of 0.940 to 0.960 $g/cm^3$, more preferably 0.950 to 0.960 $g/cm^3$.

In another preferred embodiment, the separator further comprises an antioxidant; the content of the antioxidant is 0.5-20 parts by weight, preferably 1.5-16 parts by weight, most preferably 2-12 parts by weight, on the basis that the total weight of the ultrahigh molecular weight polyethylene and the high-density polyethylene is 100 parts.

The antioxidant may be one or more of 4,4-thiobis(6-tert-butyl-m-cresol), dibutylhydroxytoluene, phosphite, tert-butyl hydroquinone, n-octadecyl-β-(3,5-di-tert-butyl-4-hydroxyphenyl)-propionate, 1,1,3-tris(2-methyl-4-hydroxy-5-tert-butylphenyl) butane, 2-tert-butyl-6-methylphenol, N,N'-bis(β-naphthyl)-p-phenylenediamine, dilauryl thiodipropionate, tris(nonylphenyl) phosphite, and triphenyl phosphite.

In a second aspect, the invention provides a method for preparing the separator according to present invention as mentioned above, the method comprising the steps of:

(1) mixing a grafted polyolefin, an ethylene copolymer, an ultrahigh molecular weight polyethylene having a molecular weight of $1.0 \times 10^6$ to $10.0 \times 10^6$, a high-density polyethylene having a density of 0.940 to 0.976 g/cm$^3$, an antioxidant, and a pore-forming agent to form a mixture;
(2) extruding the mixture into a strip by an extruder;
(3) extracting the strip with an organic solvent;
(4) stretching the extracted strip into a film by a stretching machine; and
(5) subjecting the film to heat setting and winding to obtain a separator for lithium ion battery as mentioned above.

In a preferred embodiment, the content of the ethylene copolymer is 1-5 parts by weight, preferably 1-3 parts by weight, on the basis that the total weight of the ultrahigh molecular weight polyethylene and the high-density polyethylene is 100 parts.

In another preferred embodiment, the content of the grafted polyolefin is 0-5 parts by weight, more preferably 0-3 parts by weight.

In another preferred embodiment, the weight ratio of the ultrahigh molecular weight polyethylene to the high-density polyethylene is 1:1 to 1:20; more preferably 1:2 to 1:10; most preferably 1:5 to 1:10.

In another preferred embodiment, the amount of the pore-forming agent is 500 to 2000 parts by weight, preferably 700 to 1800 parts by weight, most preferably 800 to 1600 parts by weight, on the basis that the total weight of the ultrahigh molecular weight polyethylene and the high-density polyethylene is 100 parts; the pore-forming agent may be one or more of natural mineral oils, $C_{6-15}$ alkanes, $C_{8-15}$ aliphatic carboxylic acids, $C_{1-4}$ alkyl $C_{8-15}$ aliphatic carboxylates, and $C_{2-6}$ halogenated alkanes.

The amount of the antioxidant is 0.5-20 parts by weight, preferably 1.5-16 parts by weight, most preferably 2-12 parts by weight, on the basis that the total weight of the ultrahigh molecular weight polyethylene and the high-density polyethylene is 100 parts; the antioxidant may be one or more of 4,4-thiobis(6-tert-butyl-m-cresol), dibutylhydroxytoluene, phosphite, tert-butyl hydroquinone, n-octadecyl-β-(3,5-di-tert-butyl-4-hydroxy-phenyl)-propionate, 1,1,3-tris (2-methyl-4-hydroxy-5-tert-butylphenyl) butane, 2-tert-butyl-6-methylphenol, N,N'-bis(β-naphthyl)-p-phenylenediamine, dilauryl thiodipropionate, tris (nonylphenyl) phosphite, and triphenyl phosphite.

In another preferred embodiment, the organic solvent used for the extraction is selected from dichloromethane, n-hexane, ethyl acetate or acetone.

In a third aspect, the invention provides a lithium ion battery comprising a positive electrode, a negative electrode, a separator between the positive electrode and the negative electrode, and an electrolyte, wherein the separator is a separator as described in the first aspect of the invention.

In a fourth aspect, the invention provides the use of ethylene copolymer B for the preparation of a lithium ion battery separator, and the ethylene copolymer B is one or more selected from the group consisting of ethylene-vinyl acetate copolymer, ethylene-acrylate copolymer, ethylene-methacrylic acid copolymer, ethylene-acrylic acid copolymer, and ethylene-methyl methacrylate copolymer.

Therefore, the present invention provides a high-wettability polymeric separator.

EMBODIMENTS

As used herein, "a lithium ion battery" includes a lithium secondary battery, a lithium ion secondary battery, and the like; the lithium ion secondary battery includes a polymer lithium ion secondary battery.

In present invention, unless specified otherwise, the numerical range "a-b" means an abbreviated representation of any real numbers combination between a and b, where a and b are both real numbers. For example, a numerical range of "0-5" means that all real numbers between "0-5" have been listed herein, and "0-5" is only an abbreviated representation of these numerical combinations.

In present invention, unless specified otherwise, the integer numerical range "a-b" means an abbreviated representation of any integer combination between a and b, where both a and b are integers. For example, the integer numerical range "1-N" means 1, 2 . . . N, wherein N is an integer.

Unless otherwise specified, the term "a" or "an" as used in the specification means "at least one".

The "range" disclosed herein is in the form of a lower limit and an upper limit. It may be one or more lower limits, and one or more upper limits, respectively. A given range is defined by selecting a lower limit and an upper limit. The selected lower and upper limits define the boundaries of a particular range. All the ranges that can be defined in this manner are inclusive and combinable, that is, any lower limit can be combined with any upper limit to form a range. For example, ranges of 60-120 and 80-110 are listed for specific parameters, which shall be understood that ranges of 60-110 and 80-120 are also contemplated. In addition, if the minimum range values 1 and 2 are listed, and if the maximum range values 3, 4 and 5 are listed, the following ranges are all contemplated: 1-3, 1-4, 1-5, 2-3, 2-4, and 2-5.

After extensive and intensive research, the inventor has found that if an ethylene copolymer is added in addition to the components required by conventional separators, a high-wettability battery separator can be obtained; and the separator has significantly improved surface wettability while having good porosity, pore size, pore size distribution and film strength of conventional polymeric separators. On such basis, the invention has been completed.

Separator

The lithium ion battery separator provided by the invention is a high-wettability battery separator. The separator has a contact angle with lithium ion battery electrolyte of 20° to 40°, preferably 21° to 30°, more preferably 22° to 27°; at the same time, the separator can also maintain other excellent properties, e.g. the separator having a thickness of 9 to 35 μm, a micropore diameter of 0.3 to 0.65 μm, and a porosity of 40 to 50%.

The raw materials for preparing a separator for electrochemical devices according to the invention may include:

(a) a mixture of an ultrahigh molecular weight polyethylene having a molecular weight of $1.0 \times 10^6$ to $10.0 \times 10^6$ and a high-density polyethylene having a density in the range of 0.940-0.976 g/cm$^3$, where the weight ratio of the ultrahigh molecular weight polyethylene to the high-density polyethylene is 1:1 to 1:20;

(b) 5-2000 parts by weight of a pore-forming agent, on the basis that the total weight of the ultrahigh molecular weight polyethylene and the high-density polyethylene is 100 parts;

(c) 0.5-20 parts by weight of an antioxidant, on the basis that the total weight of the ultrahigh molecular weight polyethylene and the high-density polyethylene is 100 parts;

(d) 0-5 parts by weight of a grafted polyolefin, on the basis that the total weight of the ultrahigh molecular weight polyethylene and the high-density polyethylene is 100 parts; and (e) 1-5 parts by weight of an ethylene copolymer, on the basis that the total weight of the ultrahigh molecular weight polyethylene and the high-density polyethylene is 100 parts.

In one embodiment of the invention, the ultrahigh molecular weight polyethylene has a molecular weight of $2.0 \times 10^6$ to $8.0 \times 10^6$, preferably $3.5 \times 10^6$ to $5.0 \times 10^6$.

In an embodiment of the invention, the high-density polyethylene has a density of 0.940-0.960 g/cm$^3$, preferably 0.950-0.960 g/cm$^3$.

In an embodiment of the invention, the weight ratio of the ultrahigh molecular weight polyethylene to the high-density polyethylene is 1:2 to 1:10, preferably 1:5 to 1:10.

In an embodiment of the invention, the content of the grafted polyolefin is 0-5 parts by weight, preferably 0-3 parts by weight, on the basis that the total weight of the ultrahigh molecular weight polyethylene and the high-density polyethylene is 100 parts.

In a preferred embodiment of the invention, the content of the ethylene copolymer is 1-3 parts by weight, on the basis that the total weight of the ultrahigh molecular weight polyethylene and the high-density polyethylene is 100 parts.

In an embodiment of the invention, the ethylene copolymer has a density of 0.936-0.950 g/cm$^3$; the grafted polyolefin has a density of 0.950-1.13 g/cm$^3$.

In an embodiment of the invention, the pore-forming agent may be one or more of natural mineral oils, $C_{6-15}$ alkanes, $C_{8-15}$ aliphatic carboxylic acids, $C_{1-4}$ alkyl $C_{8-15}$ aliphatic carboxylates, and $C_{2-6}$ halogenated alkanes; the amount of the pore-forming agent is 700-1800 parts by weight, preferably 800-1600 parts by weight, on the basis that the total weight of the ultrahigh molecular weight polyethylene and the high-density polyethylene is 100 parts.

In an embodiment of the invention, the antioxidant may be one or more of 4,4-thiobis(6-tert-butyl-m-cresol), dibutylhydroxytoluene, phosphite, tert-butyl hydroquinone, n-octadecyl-β-(3,5-di-tert-butyl-4-hydroxy-phenyl)-propionate, 1,1,3-tris(2-methyl-4-hydroxy-5-tert-butylphenyl) butane, 2-tert-butyl-6-methylphenol, N,N'-bis(β-naphthyl)-p-phenylenediamine, dilauryl thiodipropionate, tris(nonylphenyl) phosphite, and triphenyl phosphite; the content of the antioxidant is 1.5-16 parts by weight, preferably 2-12 parts by weight, on the basis that the total weight of the ultrahigh molecular weight polyethylene and the high-density polyethylene is 100 parts.

Preparation Method of the Separator

The preparation method of the separator for electrochemical device according to the invention comprises the following steps:

step 1, mixing the above raw materials according to a formulation to form a mixture;

step 2, extruding the mixture into a strip by an extruder;

step 3, extracting the strip with an organic solvent;

step 4, stretching the extracted strip into a film by a stretching machine;

step 5, subjecting the film to heat setting and winding to obtain a lithium ion battery separator according to the invention.

In above step 1, the weight ratio of the ultrahigh molecular weight polyethylene to the high-density polyethylene is 1:1 to 1:20, preferably 1:2 to 1:10, most preferably 1:5 to 1:10.

In above step 1, the amount of the ethylene copolymer is 1-5 parts by weight, preferably 1-5 parts by weight; the amount of the grafted polyolefin is 0-5 parts by weight, preferably 0-3 parts by weight, on the basis that the total weight of the ultrahigh molecular weight polyethylene and the high-density polyethylene is 100 parts.

In above step 1, the amount of the pore-forming agent is 500-2000 parts by weight, preferably 700-1800 parts by weight, most preferably 800-1600 parts by weight, on the basis that the total weight of the ultrahigh molecular weight polyethylene and the high-density polyethylene is 100 parts.

In above step 1, the content of the antioxidant is 0.5-20 parts by weight, preferably 1.5-16 parts by weight, most preferably 2-12 parts by weight, on the basis that the total weight of the ultrahigh molecular weight polyethylene and the high-density polyethylene is 100 parts.

In above step 1, the mixing can be carried out by conventional processes in the art, for example, but not limited to, stirring, ball milling, ultrasonic dispersion, and so on.

In above step 2, in an embodiment of the invention, the mixture is fed to a twin-screw extruder to allow the ultrahigh molecular weight polyethylene, the high-density polyethylene, the ethylene copolymer, optional grafted polyolefin, and an antioxidant to be continuously dissolved in the pore-forming agent within the twin-screw extruder at a temperature of above 150° C. (preferably 170-180° C.), and then continuously extruded by the twin-screw extruder (at a speed of 150-250 rpm); the extruded mixture is extruded through a (slit) die to a casting cooling roller, and cast into a strip at 75-85° C.

In above step 3, the extraction is used for removing the pore-forming agent from the strip; the organic solvent used for extraction is selected from dichloromethane, n-hexane, ethyl acetate, or acetone.

In above step 4, the extracted strip is continuously fed into a bidirectional stretching machine at 110-130° C. and is stretched into a film; in a preferred embodiment, the film is subjected to a secondary extraction, and the secondary extraction uses an organic solvent which is generally the same as used in the first extraction.

In above step 5, the film is heat set at 110-130° C. for 10-20 min, and the film is wound at a speed of 15-25 m/min.

Use of the Separator

The separator according to the invention can be used for a lithium ion battery and its preparation. The lithium ion battery includes a positive electrode, a negative electrode, a separator of the invention between the positive electrode and the negative electrode, and an electrolyte.

Conventional electrolytes in the art may be used, for example, but not limited to, the electrolytes contain alkyl carbonates organic solvents.

The features mentioned above in present invention or the features mentioned in the examples may be used in any combination. All the features described in the specification can be used in combination with any form of composition, and the various features described in the specification can be substituted by any alternative features that provide the same, equal or similar purpose. Therefore, unless otherwise specified, the described features are only general examples of equivalent or similar features.

The Main Advantages of the Invention are:

The separator according to the invention has a high electrolyte wettability, and improved porosity, pore size, pore size distribution and film strength.

The invention will be further illustrated below in combination with specific examples. It is to be understood that these examples are used only for illustrating the invention but not intended to limit the scope of the invention. The experimental methods in the following examples which do not specify the specific conditions are usually carried out under conventional conditions or the conditions recommended by the manufacturers. All percentages, ratios, proportions, or parts are based on weight, unless otherwise specified.

The unit of percent weight in volume in present invention is well known to those skilled in the art and, for example, refers to the weight of the solute in a 100 ml solution.

Unless otherwise defined, all the professional and scientific terms used herein have the same meanings as used in the art. In addition, any methods and materials that are similar or equivalent to those described may be employed in the methods of the invention. The preferred embodiments and materials described herein are for illustrative purposes only.

Experimental Methods

1. Measurement of Thickness

The thickness is measured by using Film Thickness Gauge 1216 from Mahr Inc., Germany, according to GB/T6672-2001, a method for measuring the thickness of plastic film and sheet.

2. Measurement of Resistance

The resistance is measured at two points 10 cm apart on the separator by using a multimeter, the adopted result is an average of 10 measured values on different measurement points.

3. Measurement of Transmission

The transmission is measured by using Gurley Densometer 4110, according to GB/T1037, a testing method for water vapor transmission of plastic film and sheet.

4. Measurement of Porosity

The porosity is measured by using PoreMaster-33, an automatic mercury porosimeter available from Quantachrome Inc.

5. Measurement of Pore Size

The pore size is measured by using UV-3200 large screen scanning UV spectrophotometer.

6. Measurement of Contact Angle

The contact angle with lithium ion battery electrolyte is measured by using DSA100, a vedeo contact angle analizer available from Kruss Inc. Germeny, and the electrolyte used for the measurement is an electrolyte for lithium iron phosphate cylindrical cells.

7. Measurement of Puncture Strength

The puncture strength is measured by using Universal Tester QJ210A available from Shanghai QingJi Corporation, according to GB/T 2679.7, Puncture Strength for Paperboard.

8. Measurement of Tensile Strength

The tensile strength is measured by using Universal Tester QJ210A available from Shanghai QingJi Corporation, according to ASTM d882-2002, Standard Test Method for Tensile Properties of Thin Plastic Sheet.

In the following examples, the maleic anhydride grafted polyethylene has a density of 0.956 g/cm$^3$, the ethylene-vinyl acetate copolymer and ethylene-acrylic copolymer have a density of 0.946 g/cm$^3$.

Comparative Example 1

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 9.6 g of maleic anhydride grafted polyethylene, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant and the maleic anhydride grafted polyethylene were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator, and its specific performance parameters were tested as shown in the following table:

| Performance | |
| --- | --- |
| Thickness | 12 μm |
| Resistance (MacMullin) | 8 |
| Transmission (Gurley value) | 211 |
| Porosity | 47% |
| Pore size | 0.46 μm |
| Contact angle | 58.3° |
| Puncture strength | 560 g |
| Tensile strength | Longitudinal: 182 MPa transverse: 161 MPa |

Example 1

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 9.6 g of ethylene-vinyl acetate copolymer, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant and the ethylene-vinyl acetate copolymer were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator. Its specific performance parameters were tested as shown in the following table:

| Performance | |
|---|---|
| Thickness | 12 μm |
| Resistance (MacMullin) | 7 |
| Transmission (Gurley value) | 216 |
| Porosity | 45% |
| Pore size | 0.48 μm |
| Contact angle | 26.2° |
| Puncture strength | 550 g |
| Tensile strength | longitudinal: 177 MPa |
| | transverse: 159 MPa |

Example 2

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 4.8 g of maleic anhydride grafted polyethylene, 4.8 g of ethylene-vinyl acetate copolymer, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant, the maleic anhydride grafted polyethylene and the ethylene-vinyl acetate copolymer were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator. Its specific performance parameters were tested as shown in the following table:

| Performance | |
|---|---|
| Thickness | 12 μm |
| Resistance (MacMullin) | 7.5 |
| Transmission (Gurley value) | 210 |
| Porosity | 46% |
| Pore size | 0.43 μm |
| Contact angle | 35.1° |
| Puncture strength | 570 g |
| Tensile strength | longitudinal: 185 MPa |
| | transverse: 163 MPa |

Example 3

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 3.2 g of maleic anhydride grafted polyethylene, 6.4 g of ethylene-vinyl acetate copolymer, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant, the maleic anhydride grafted polyethylene and the ethylene-vinyl acetate copolymer were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator. Its specific performance parameters were tested as shown in the following table:

| Performance | |
|---|---|
| Thickness | 12 μm |
| Resistance (MacMullin) | 7 |
| Transmission (Gurley value) | 201 |
| Porosity | 48% |
| Pore size | 0.45 μm |
| Contact angle | 23.5° |
| Puncture strength | 550 g |
| Tensile strength | longitudinal: 181 MPa |
| | transverse: 168 MPa |

Example 4

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 6.4 g of maleic anhydride grafted polyethylene, 3.2 g of ethylene-vinyl acetate copolymer, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant, the maleic anhydride grafted polyethylene and the ethylene-vinyl acetate copolymer were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator. Its specific performance parameters were tested as shown in the following table:

| Performance | |
|---|---|
| Thickness | 12 μm |
| Resistance (MacMullin) | 7.5 |
| Transmission (Gurley value) | 220 |
| Porosity | 43% |
| Pore size | 0.41 μm |
| Contact angle | 38.1° |
| Puncture strength | 560 g |
| Tensile strength | longitudinal: 188 MPa transverse: 165 MPa |

Example 5

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 3.2 g of maleic anhydride grafted polyethylene, 6.4 g of ethylene-acrylic acid copolymer, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant, the maleic anhydride grafted polyethylene and the ethylene-acrylic acid copolymer were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator. Its specific performance parameters were tested as shown in the following table:

| Performance | |
|---|---|
| Thickness | 12 μm |
| Resistance (MacMullin) | 7 |
| Transmission (Gurley value) | 203 |
| Porosity | 48% |
| Pore size | 0.47 μm |
| Contact angle | 24.2° |
| Puncture strength | 545 g |
| Tensile strength | longitudinal: 180 MPa transverse: 170 MPa |

Comparative Example 2

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, and the antioxidant, were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator, and its specific performance parameters were tested as shown in the following table:

| Performance | |
|---|---|
| Thickness | 12 μm |
| Resistance (MacMullin) | 9 |
| Transmission (Gurley value) | 212 |
| Porosity | 45% |
| Pore size | 0.47 μm |
| Contact angle | 88.1° |
| Puncture strength | 550 g |
| Tensile strength | longitudinal: 180 MPa transverse: 162 MPa |

Comparative Example 3

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 16.0 g of ethylene-vinyl acetate copolymer, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant, and the ethylene-vinyl acetate copolymer were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator, and its specific performance parameters were tested as shown in the following table:

| Performance | |
|---|---|
| Thickness | 12 μm |
| Resistance (MacMullin) | 7 |
| Transmission (Gurley value) | 221 |
| Porosity | 46% |
| Pore size | 0.49 μm |
| Contact angle | 27.1° |
| Puncture strength | 500 g |
| Tensile strength | longitudinal: 170 MPa<br>transverse: 155 MPa |

Comparative Example 4

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 32.0 g of ethylene-vinyl acetate copolymer, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant, and the ethylene-vinyl acetate copolymer were continuously dissolved in the mineral oil in the twin-screw extruder at 180° C., and continuously extruded by a twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator, and its specific performance parameters were tested as shown in the following table:

| Performance | |
|---|---|
| Thickness | 12 μm |
| Resistance (MacMullin) | 7 |
| Transmission (Gurley value) | 210 |
| Porosity | 48% |
| Pore size | 0.50 μm |
| Contact angle | 28.0° |
| Puncture strength | 480 g |
| Tensile strength | longitudinal: 160 MPa<br>transverse: 151 MPa |

Comparative Example 5

220 g of high-density polyethylene having a density of 0.956 g/cm$^3$, 100 g of ultrahigh molecular weight polyethylene having a molecular weight of 5.0×10$^6$, 6.4 g of n-octadecyl-β-(3,5-di-tert-butyl-4-hydroxyphenyl)-propionate (antioxidant), 3.2 g of triethoxyvinylsilane grafted polyethylene, 6.4 g of ethylene-vinyl acetate copolymer, and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, the high-density polyethylene, the antioxidant, the triethoxyvinylsilane grafted polyethylene and the ethylene-vinyl acetate copolymer were continuously dissolved in the mineral oil in the twin-screw extruder at 180° C., and continuously extruded by the twin-screw extruder at a speed of 200 rpm. The mixture continuously entered a slit die, and was extruded through the slit die to a casting cooling roller and cast into a strip at 80° C.

The obtained strip was placed in an extraction tank containing dichloromethane for extraction to remove the mineral oil from the strip. The extracted strip was continuously fed into a biaxial stretching machine at 120° C. to be stretched into a film, then the resulting film material was subjected to secondary extraction with dichloromethane, and the resulting film was washed with deionized water, heat set at 120° C. for 15 min, and wound at a speed of 20 m/min to obtain a separator, and its specific performance parameters were tested as shown in the following table:

| Performance | |
|---|---|
| Thickness | 12 μm |
| Resistance (MacMullin) | 8 |
| Transmission (Gurley value) | 207 |
| Porosity | 47% |
| Pore size | 0.46 μm |
| Contact angle | 35.3° |
| Puncture strength | 530 g |
| Tensile strength | longitudinal: 175 MPa<br>transverse: 160 MPa |

As can be seen from above results, the separator prepared without adding ethylene copolymer has a relatively large contact angle with the electrolyte, correspondingly the resistance is relatively large (Comparative Example 2); after addition of ethylene copolymer, the contact angle with the electrolyte and the resistance are significantly reduced. This may be mainly due to the fact that the ethylene copolymer contains a large amount of ester groups or carboxylic acid functional groups, which are similar in polarity to the main components of the lithium ion battery electrolyte; as a result, improved wettability can be obtained. The separator prepared by solely adding maleic anhydride grafted polyethylene exhibits a relatively large contact angle with the electrolyte (Comparative Example 1).

As also can be seen from above results, addition of less than 5 parts by weight of ethylene copolymer, on the basis that the total weight of the ultrahigh molecular weight polyethylene and the high-density polyethylene is 100 parts, has no significant effect on the pore size and strength of the separator, thereby maintaining the original properties of the separator material while obtaining improved wettability. When the amount of ethylene-vinyl acetate copolymer was 5 parts by weight (Comparative example 3), the puncture strength and tensile strength of the separator begin to decrease; when the amount of ethylene-vinyl acetate copolymer was 10 parts by weight (Comparative example 4), the puncture strength and tensile strength of the separator significantly decrease, which may be due to the low strength of such copolymer per se. Moreover, as can be seen from Comparative example 5, when the grafted polymers without ester groups or carboxylic acid functional groups are used in combination with ethylene-vinyl acetate copolymer, a contact angle of less than 30° cannot be obtained, and the puncture strength and the tensile strength of the separator are also slightly reduced, which may be due to poor compatibility between such grafted polymer and ethylene-vinyl acetate copolymer.

The above are only preferred examples of the invention and are not intended to limit the scope of the substantive technical content of the invention. The substantive technical content of the invention is broadly defined in the scope of the claims as attached. Any technical entity or method that is completed by others, if it is exactly the same as defined in the scope of the claims of the application, or an equivalent change, is considered to be within the scope of the claims.

What is claimed is:

1. A lithium ion battery separator, wherein the separator consists of:
    an ethylene copolymer, a grafted polyolefin, an ultrahigh molecular weight polyethylene having a molecular weight of $3.5 \times 10^6$ to $10.0 \times 10^6$, and a high-density polyethylene having a density in the range of 0.940 to 0.976 g/cm$^3$;
    wherein the content of the ethylene copolymer is 1-5 parts by weight and the content of the grafted polyolefin is 1-5 parts by weight, on the basis that the total weight of the ultrahigh molecular weight polyethylene and the high-density polyethylene is 100 parts;
    wherein the ethylene copolymer is one or more selected from the group consisting of ethylene-vinyl acetate copolymer, ethylene-acrylate copolymer, ethylene-acrylic acid copolymer, and ethylene-methyl methacrylate copolymer; and
    wherein the grafted polyolefin is one or more selected from the group consisting of maleic anhydride grafted polyethylene, and glycidyl methacrylate grafted polyethylene.

2. The separator according to claim 1, wherein the separator has a contact angle with a lithium ion battery electrolyte of 20° to 40°.

3. The separator according to claim 1, wherein the weight ratio of the ultrahigh molecular weight polyethylene to the high-density polyethylene is 1:1 to 1:20.

4. A method for preparing a lithium ion battery separator according to claim 1, wherein the method comprises the steps of:
    mixing an ethylene copolymer, a grafted polyolefin, an ultrahigh molecular weight polyethylene having a molecular weight of $3.5 \times 10^6$ to $10.0 \times 10^6$, a high-density polyethylene having a density of 0.940 to 0.976 g/cm$^3$, an antioxidant, and a pore-forming agent to form a mixture; wherein the content of the ethylene copolymer is 1-5 parts by weight and the content of the grafted polyolefin is 1-5 parts by weight, on the basis that the total weight of the ultrahigh molecular weight polyethylene and the high-density polyethylene is 100 part; wherein the ethylene copolymer is one or more selected from the group consisting of ethylene-vinyl acetate copolymer, ethylene-acrylate copolymer, ethylene-acrylic acid copolymer, and ethylene-methyl methacrylate copolymer; and wherein the grafted polyolefin is one or more selected from the group consisting of maleic anhydride grafted polyethylene, and glycidyl methacrylate grafted polyethylene;
    extruding the mixture into a strip by an extruder;
    extracting the strip with an organic solvent;
    stretching the extracted strip into a film by a stretching machine; and
    subjecting the film to heat setting and winding to obtain the lithium ion battery separator.

5. The preparation method according to claim 4, wherein the ethylene copolymer is added in an amount of 1-5 parts by weight, on the basis that the total weight of the ultrahigh molecular weight polyethylene and the high-density polyethylene is 100 parts.

6. The preparation method according to claim 4, wherein the weight ratio of the ultrahigh molecular weight polyethylene to the high-density polyethylene is 1:1 to 1:20.

7. A lithium ion battery comprising a positive electrode, a negative electrode, a separator between the positive electrode and the negative electrode, and an electrolyte, wherein the separator is a separator according to claim 1.

* * * * *